(12) United States Patent
Osherov et al.

(10) Patent No.: US 7,008,565 B2
(45) Date of Patent: Mar. 7, 2006

(54) FLEXIBLE ELECTROCONDUCTIVE FOAM, AND METHOD OF PREPARATION THEREOF

(75) Inventors: Alexander Osherov, Beer Sheva (IL); Leonid Sklyarski, Kiryat Bialik (IL); Ilya Glants, Ashdod (IL); Yuri Katsman, Hadera (IL)

(73) Assignee: More Energy Ltd., Lod (IL)

( * ) Notice: Subject to any disclaimer, the term of this patent is extended or adjusted under 35 U.S.C. 154(b) by 376 days.

(21) Appl. No.: 10/290,512

(22) Filed: Nov. 8, 2002

(65) Prior Publication Data

US 2004/0089849 A1 May 13, 2004

(51) Int. Cl.
 *H01B 1/20* (2006.01)
 *B05D 5/12* (2006.01)
 *B32B 1/00* (2006.01)

(52) U.S. Cl. .............. 252/511; 252/500; 252/502; 252/519.34; 428/31.5; 428/304; 428/323; 428/423.1; 427/108; 427/103

(58) Field of Classification Search ............... 252/500, 252/502, 511, 519.34; 427/180, 103; 428/31.5, 428/304, 323, 423.1
See application file for complete search history.

(56) References Cited

U.S. PATENT DOCUMENTS

| 5,328,716 A | * | 7/1994 | Buchanan .................. 427/121 |
| 5,334,292 A | | 8/1994 | Rajeshwar et al. |
| 5,431,998 A | * | 7/1995 | Wettermark et al. ...... 428/310.5 |
| 5,567,740 A | | 10/1996 | Free |
| 5,585,040 A | | 12/1996 | Kirmanen et al. |
| 5,656,344 A | * | 8/1997 | Sawa et al. ................ 428/36.5 |
| 5,662,833 A | | 9/1997 | Laakso et al. |
| 5,783,111 A | | 7/1998 | Ikkala et al. |
| 6,214,260 B1 | * | 4/2001 | Bessette et al. ............. 252/511 |
| 6,380,126 B1 | | 4/2002 | Finkelshtain et al. |

* cited by examiner

*Primary Examiner*—Mark Kopec
*Assistant Examiner*—Kallambella Vijayakumar
(74) *Attorney, Agent, or Firm*—Mark M. Friedman

(57) ABSTRACT

A method of preparing an electroconductive foam, and the foam so prepared. An electroconductive polymer such as polyaniline is dispersed in a liquid medium that includes an aromatic solvent such as xylene and an organic dopant/dispersant such as an aromatic sulfonic acid. The electroconductive polymer together with the organic dopant/dispersant constitute between 10% and 25% of the resulting dispersion. The dispersion is introduced to the pores of an electrically insulating foam matrix such as polyurethane. Excess dispersion is expelled and the foam is dried actively, to line the pores with an electroconductive lining.

20 Claims, 1 Drawing Sheet

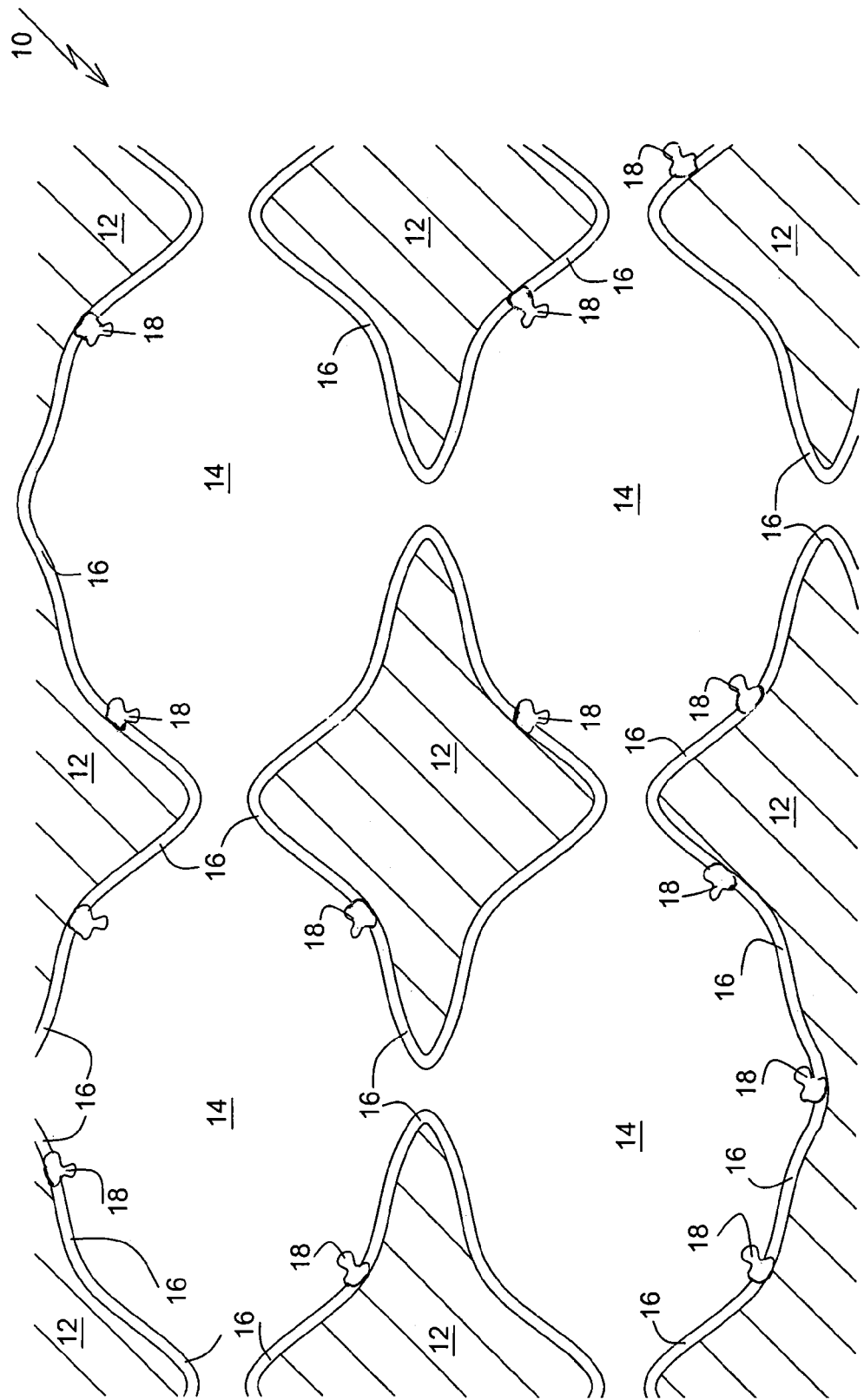
FIGURE

FLEXIBLE ELECTROCONDUCTIVE FOAM, AND METHOD OF PREPARATION THEREOF

FIELD AND BACKGROUND OF THE INVENTION

The present invention is related to a method of preparing a flexible electroconductive foam, and the electroconductive foam so prepared.

Flexible, electrically conducting foams are used as EMI (electromagnetic interference) shielding materials, electroconductive gaskets, gas sensors and electrostatic filters.

Two methods are known in the art for preparing flexible, electrically conductive foams.

In the first method, electrically conducting filler particles are mixed with the precursor of an otherwise electrically insulating polymer foam. The resulting foam is a combination of the electrically insulating polymer and the electrically conducting filler. Filler materials include particulate metals, particulate amorphous carbon, particulate graphite and particulate electroconductive polymers such as polypyrrole, polythiophene and polyaniline. The problem with this method is that the amount of filler that must be included in the foam in order to obtain adequate electrical conductivity is sufficient to degrade the structural and mechanical properties of the foam relative to the structural and mechanical properties of the electrically insulating base foam.

In the second method, an electrically conductive laser is formed on the surfaces of the pores of an otherwise electrically insulating polymer foam matrix. An electrically conductive material in particulate form is dispersed in a liquid (aqueous or organic) medium to form a dispersion. Examples of suitable electrically conductive materials include metals, amorphous carbon, graphite and electroconductive polymers. The dispersion is introduced to the pores of the matrix, for example by dipping the matrix in the dispersion or by painting the matrix with the dispersion. Excess dispersion is expelled from the matrix, for example by squeezing the matrix. Finally, the dispersion in the matrix pores is allowed to dry in ambient air. The liquid medium evaporates, leaving behind a layer of the electrically conducting particles on the surfaces of the pores of the matrix.

When a metal is used as the electrically conductive material, the second method provides an electrically conductive foam with a low resistivity, possibly as low as 0.1 ohm-cm, and satisfactory mechanical properties; but such electrically conductive foams are very expensive. Electrically conductive foams made by the second method using carbon or graphite as the electrically conductive material are less expensive, but the liquid medium must include a binder, such as vinyl resin acrylic resin or nitrocellulose, to bind the particles to the pore surfaces. One disadvantage of such electrically conductive foams is that it is difficult to optimize the binder concentration. High binder concentration gives better particulate adhesion to the pore surfaces and improved mechanical properties, at the expense of reduced electrical conductivity because of insulator bridge formation between the carbon or graphite particles. Low binder concentration gives poor particulate adhesion: the resulting foam tends to shed particles and so is unsuitable for some applications Another disadvantage of such electrically conductive foams is that a particulate concentration in excess of 30% often is needed to obtain adequate conductivity. Such a high particulate concentration degrades the mechanical strength, flexibility and permeability of the foam.

Electroconductive polymers, being polymers just like the matrix material, would be expected to be the most mechanically compatible with the foam matrix of all the electrically conducting materials. In practice, however, the electrically conducting layers formed using dispersions of electroconductive polymers in water and in polar organic solvents such as alcohols tend to be discontinuous, so that the resulting electrically conductive foams have relatively high resistivities. Dilute dispersions of electroconductive polymers in nonpolar solvents (for example, polyaniline in xylene) give more continuous electrically conductive layers; but nonpolar solvents cause the matrix to swell, thereby degrading the electrical conductivity of the resulting electrically conducting foam by reducing the porosity and permeability of the foam.

There is thus a widely recognized need for, and it would be highly advantageous to have, a more satisfactory method of impregnating an electrically insulating polymer foam matrix with an electroconductive polymer to produce an electrically conductive foam.

SUMMARY OF THE INVENTION

According to the present invention there is provided a method for preparing an electroconductive foam, including the steps of: (a) preparing a dispersion by dispersing: (i) an electroconductive polymer and (ii) an organic compound that acts both as a dopant for the electroconductive polymer and as a dispersant for the electroconductive polymer in an aromatic solvent, the electroconductive polymer and the organic compound together constituting between about 10% and about 25% by weight of the dispersion; (b) providing an electrically insulating foam having a plurality of pores; and (c) introducing the dispersion to at least a portion of the pores, thereby forming a precursor foam.

According to the present invention there is provided an electroconductive foam including: (a) an electrically insulating foam matrix including a plurality of interconnected pores; and (b) an electroconductive lining, of at least a portion of the pores, including an electroconductive polymer; wherein the electroconductive foam has a resistivity of at most about 0.1 ohm-centimeters.

According to the present invention there is provided a dispersion, for use in preparing an electroconductive foam, including: (a) an aromatic solvent; (b) an electroconductive polymer dispersed in the aromatic solvent; and (c) an organic compound that acts both as a dopant for the electroconductive polymer and as a dispersant for the electroconductive polymer; wherein the electroconductive polymer and the organic compound together constitute between about 10% and about 25% by weight of the dispersion.

Surprisingly, we have found that the swelling of the matrix by aromatic solvents can be largely mitigated by using a more concentrated dispersion: a dispersion that includes between about 10% and about 25% by weight of the electroconductive polymer and the organic dopant/dispersant, vs. less than 8% electroconductive polymer plus organic dopant/dispersant by weight in the prior art dispersion. In addition, the precursor foam, that is produced by introducing the dispersion into the pores of the matrix, is dried actively, for example in a convection dryer and/or in vacuum, rather than passively by just letting the precursor foam sit in ambient air as is common in the prior art.

Preferred organic dopants/dispersants include aromatic sulfonic acids such as benzenesulfonic acid, toluenesulfonic acid, dodecylbenzenesulfonic acid, butylbenzenesulfonic acid, napthalenesulfonic acid and camphor sulfonic acid.

Preferably, the ratio by weight of the electroconductive polymer to the dopant/dispersant in the dispersion is between about 1:1 and about 5:1.

Preferably, if vacuum drying is used, the precursor foam also is dried in an airflow prior to being dried in the vacuum.

Preferred aromatic solvents include benzene, toluene, p-xelene, m-xylene, o-xylene, ethylbenzene, diethylbenzene and anisole.

Preferably, the electrically insulating foam has an interconnected network of open pores. The most preferred electrically insulating foam is polyurethane foam.

Preferably, excess dispersion is expelled from the precursor foam, for example by squeezing the precursor foam, prior to drying the precursor foam. The combination of introducing the dispersion to the pores of the electrically insulating foam by soaking the electrically insulating foam in the dispersion, followed by squeezing the precursor foam, is the familiar "dip and nip" technique.

Preferred electroconductive polymers include polyaniline, polyacetylene, polypyrrole, polythiophene, polyethylenedioxythiophene and poly(p-phenylene vinylene). The most preferred electroconductive polymer is polyaniline. Preferably, the electroconductive polymer constitutes between about 1% and about 10% of the dispersion by weight.

Preferably, the dispersion also includes a binder. Preferably, the binder constitutes between about 0.03% and about 2.5% of the dispersion by weight.

Preferably, the preparation of the dispersion also includes the step of dispersing particulate carbon in the aromatic solvent. Preferably, the particulate carbon includes graphite powder that constitutes between about 0.5% and about 15% of the dispersion by weight. Alternatively or additionally, the particulate carbon includes graphite flakes that constitute between about 1% and about 25% of the dispersion by freight. Alternatively or additionally, the particulate carbon includes amorphous carbon powder that constitutes between about 0.5% and about 15% of the dispersion by weight.

The scope of the present invention also includes both the dispersion used in the method of the present invention and an electrically conducting foam prepared according to the method of the present invention.

The scope of the present invention also includes an electroconductive foam that includes an electrically insulating foam matrix with a plurality of interconnected pores. At least a portion of the pores have an electroconductive lining that includes an electroconductive polymer. The electroconductive foam of the present invention has a resistivity of at most about 0.1 ohm-centimeters, despite the absence of metal in the electroconductive lining. Preferably, the electroconductive polymer is polyaniline, polyacetylene, polypyrrole, polythiophene, polyethylenedioxythiophene or poly(p-phenylene vinylene). Preferably, the electroconductive lining also includes particulate carbon.

Sometimes, a distinction is made in the art between "foams" whose cells or pores are closed and "sponges" whose cells or pores are interconnected. This distinction is not made herein. Instead, the term "foam" as used herein refers to a cellular or porous solid structure with either closed pores or open pores. As will be readily appreciated, foams with open, interconnected pores are greatly preferred over foams with closed pores, although the scope of the present invention includes foams with initially closed pores. For example, the pores of the electrically insulating foam to which the dispersion of the present invention is introduced could be initially closed, the act of introducing the dispersion to the pores would rupture some of the pore walls, thereby creating the interconnected pore network of the final electroconductive foam.

BRIEF DESCRIPTION OF THE DRAWINGS

The invention is herein described, by way of example only, with reference to the accompanying drawings, wherein:

The sole FIGURE is a schematic cross section of an electroconductive foam of the present invention.

DESCRIPTION OF THE PREFERRED EMBODIMENTS

The present invention is of a method of preparing an electroconductive foam, and of the electroconductive foam so prepared.

The principles and operation of electroconductive foam preparation according to the present invention may be better understood with reference to the drawings and the accompanying description.

The electroconductive foam of the present invention is prepared by introducing, to at least a portion of the pores of an electrically insulating polymer base foam such as polyurethane, a dispersion of an electroconductive polymer and all organic dopant/dispersant in an aromatic solvent, thereby producing a precursor foam. Preferred aromatic solvents include benzene, toluene, p-xylene, m-xylene, o-xylene, ethylbenzene, o-diethylbenzene, m-diethylbenzene, p-diethylbenzene and anisole. The electroconductive polymer and the organic dopant/dispersant together constitute between about 10% and about 25% of the dispersion by weight. Excess dispersion is expelled from the precursor foam, for example by squeezing the precursor foam. Finally the precursor foam is dried, with at least part of the drying being effected in vacuum and at a temperature of at least about 70° C., causing the aromatic solvent to evaporate and leaving behind a continuous electroconductive polymer layer lining the pore surfaces.

Because of the reduced swelling of the insulating foam matrix when an electroconductive foam is prepared according to the method of the present invention, the matrix retains most of its porosity and permeability. As a result, the resulting electroconductive foam has a resistivity of at most about 0.1 ohm-centimeters.

Preferred electroconductive polymers include polyaniline, polyacetylene, polypyrrole, polythiophene, polyethylenedioxythiophene and poly(p-phenylene vinylene). The most preferred electroconductive polymer is polyaniline.

As noted above, the dispersion of the present invention includes an organic compound, for example an aromatic sulfonic acid, that acts as both a dopant of the electroconductive polymer and a dispersant of the electroconductive polymer. Depending on the nature of the base polymer and the electroconductive polymer, this organic compound may also increase the compatibility of the electroconductive polymer with the pore surfaces of the base foam. For example, aromatic sulfonic acids generally enhance the compatibility of polyaniline with polyurethane base foam. Preferred aromatic sulfonic acids include benzenesulfonic acid, toluenesulfonic acid, dodecylbenzenesulfonic acid, butylbenzenesulfonic acid, napthalenesulfonic acid and camphor sulfonic acid.

Most preferably, the dispersion of the present invention is prepared by dispersing both one or more electroconductive polymers and one or more organic dopants/dispersants and one or more forms of particulate carbon (graphite powder and/or graphite flakes and/or amorphous carbon powder) in the aromatic solvent. It is believed that at least some of the carbon particles together with electroconductive polymer enter the partially swollen foam matrix and so become incorporated in the electroconductive pore lining, rather than merely physically bound to the electroconductive pore lining. As a result, the embodiment of the electroconductive foam of the present invention that includes particulate carbon tends to shed carbon particles to a much lower extent than comparable prior art electroconductive foams.

Referring now to the drawings, the sole FIGURE is a schematic cross section of an electroconductive foam 10 of the present invention. Foam 10 is based on a porous foam matrix 12 of an electrically insulating polymer with a network of interconnected pores 14. Lining the surfaces of pores 14 is an electrically conducting linings 16 that is a mixture of an electroconductive polymer with matrix polymer. Embedded in lining 16 are electrically conducting carbon particles 18.

EXAMPLES

The base matrix of all of the following examples is a porous polyurethane foam, specifically, a 1 millimeter thick sheet of hydrophobic 80 ppi polyurethane foam, 40 cm$^2$ in area, obtained from Foamex International Inc. of Linwood, Pa. USA.

Example 1 (Prior Art)

Electroconductive polymer: 9 g polyaniline.
Liquid medium: 9 ml 4.5% aqueous solution of polyvinyl alcohol. 132 ml water, 9 g dodecylbenzenesulfonic acid.

The polyaniline was dispersed in the liquid medium by milling in a ball mill for 4 hours at 400 rpm. The polyurethane foam was impregnated with the resulting dispersion by the "dip and nip" technique to produce a precursor foam. The precursor foam was dried in ambient air at room temperature for 30 minutes and then in a vacuum oven at 70° C. for one hour.

Example 2

Electroconductive polymer: 7 g polyaniline.
Liquid medium: 70 ml m-xylene, 9 g dodecylbenzenesulfonic acid.

The polyaniline was dispersed in the xylene by milling in a ball mill for 1.5 hours at 400 rpm. The dodecylbenzenesulfonic acid was added to the dispersion and the dispersion was milled in the ball mill for another 1.5 hours at 400 rpm. The polyurethane foam was impregnated with the resulting dispersion by the "dip and nip" technique to produce a precursor foam. The precursor foam was dried in an ambient air airflow at room temperature for 30 minutes and then in a vacuum oven at 70° C. for 30 minutes.

Example 3

Electroconductive polymer: 30 g polyaniline.
Particulate carbon: 18 g graphite flakes.
Liquid medium: 300 ml m-xylene, 30 g dodecylbenzenesulfonic acid.

The polyaniline was dispersed in 200 ml of the xylene by milling in a ball mill for 2.5 hours at 400 rpm. The dodecylbenzenesulfonic acid and the remaining 100 ml of the xylene were added to the dispersion and the dispersion was milled in the ball mill for another 1.5 hours at 400 rpm. The graphite was added to the dispersion and the dispersion was milled in the ball mill for another 4.5 hours at 400 rpm. The polyurethane foam was impregnated with the resulting dispersion by the "dip and nip" technique to produce a precursor foam. The precursor foam was dried in an ambient air airflow at room temperature for 30 minutes and then in a vacuum oven at 70° C. for 30 minutes.

The following table shows the % weight increase of the electroconductive foam over the base foam, and the resistivity of the electroconductive foam, for all three examples:

|  | Weight increase (%) | Resistivity (ohm-cm) |
| --- | --- | --- |
| Example 1 | 237 | 0.29 |
| Example 2 | 971 | 0.1 |
| Example 3 | 865 | 0.006 |

While the invention has been described with respect to a limited number of embodiments, it will be appreciated that many variations, modifications and other applications of the invention may be made.

What is claimed is:

1. A method for preparing an electroconductive foam, comprising the steps of:
    (a) preparing a dispersion by dispersing:
        (i) an electroconductive polymer and
        (ii) an organic compound that acts both as a dopant for said electroconductive polymer and as a dispersant for said electroconductive polymer
        in an aromatic solvent, said electroconductive polymer and said organic compound together constituting between about 10% and about 25% by weight of said dispersion;
    (b) providing an electrically insulating foam having a plurality of pores; and
    (c) introducing said dispersion to at least a portion of said pores, thereby forming a precursor foam.
2. The method of claim 1, further comprising the step of:
    (d) drying said precursor foam, thereby obtaining the electroconductive foam.
3. The method of claim 2, wherein said drying is active drying.
4. The method of claim 2, further comprising the step of:
    (e) expelling excess said dispersion from said precursor foam, prior to said drying.
5. The method of claim 4, wherein said expelling is effected by squeezing said precursor foam.
6. The method of claim 1, wherein said electroconductive polymer is selected from the group consisting of polyaniline, polyacetylene, polypyrrole, polythiophene, polyethylenedioxythiophene and poly(p-phenylene vinylene).
7. The method of claim 6, wherein said electroconductive polymer is polyaniline.
8. The method of claim 1, wherein said aromatic solvent is selected from the group consisting of benzene, toluene, p-xylene, m-xylene, o-xylene, ethylbenzene, diethylbenzene and anisole.
9. The method of claim 1, wherein said organic compound is an aromatic sulfonic acid.
10. The method of claim 9, wherein said aromatic sulfonic acid is selected from the group consisting of benzenesulfonic acid, toluenesulfonic acid, dodecylbenzenesulfonic acid, butylbenzenesulfonic acid, napthalenesulfonic acid and camphor sulfonic acid.

11. The method of claim 1, wherein said dispersion includes said electroconductive polymer and said organic compound in a ratio of between about 1:1 and about 5:1 by weight.

12. The method of claim 1, wherein said dispersion also includes a binder.

13. The method of claim 12, wherein said binder constitutes between about 0.03% and about 2.5% of said dispersion by weight.

14. The method of claim 1, wherein said preparing of said dispersion further includes the step of dispersing particulate carbon in said aromatic solvent.

15. The method of claim 14, wherein said particulate carbon includes graphite powder, and wherein said graphite powder constitutes between about 0.5% and about 15% of said dispersion by weight.

16. The method of claim 14, wherein said particulate carbon includes graphite flakes, and wherein said graphite flakes constitute between about 1% and about 25% of said dispersion by weight.

17. The method of claim 14, wherein said particulate carbon includes amorphous carbon powder, and wherein said amorphous carbon powder constitutes between about 0.5% and about 15% of said dispersion by weight.

18. The method of claim 1, wherein said electrically insulating foam has an interconnected network of said pores.

19. The method of claim 1, wherein said electrically insulating foam is polyurethane foam.

20. An electroconductive foam prepared by the method of claim 1.

* * * * *